United States Patent Office 3,159,575
Patented Dec. 1, 1964

3,159,575
PROCESS OF IMPROVING GREASE YIELDS
Dean W. Criddle, Pleasant Hill, Calif., assignor to California Research Corporation, San Francisco, Calif., a corporation of Delaware
No Drawing. Filed Aug. 3, 1962, Ser. No. 214,473
2 Claims. (Cl. 252—18)

This invention is directed to lubricating grease compositions, more particularly to the use of certain agents to improve the yield of calcium base greases. These particular base greases contain particular ratios of calcium 12-hydroxy stearate, calcium acetate, calcium carbonate and calcium hydroxide in combination.

During the past few years, there has been a noticeable trend in the grease art to blend grease compositions which can be used for more than one purpose; that is, the usefulness of grease compositions has been extended. These multi-purpose lubricants are rapidly displacing special purpose grease compositions throughout all fields where greases are used, particularly in the field of industrial greases. The grease compositions of the prior art, in particular those described in the patents noted hereinbelow, are useful as multi-purpose greases to a limited degree only, mainly because prior art greases lack high film strength. Furthermore, it is known that the surfaces of such grease compositions of the prior art crust upon ageing, making the grease undesirable for use. Contrary thereto, no crust forms on the surfaces of the grease compositions described herein, nor do the grease compositions harden upon ageing.

The grease art describes well the use of calcium soaps of fatty acids (e.g., calcium 12-hydroxy stearate) as grease thickening agents, and the use of metal salts of low molecular weight fatty acids (e.g., calcium acetate) as modifying agents for such grease compositions (e.g. calcium acetate as a modifying agent in grease compositions thickened with calcium 12-hydroxy stearate).

U.S. Patent No. 2,842,495 teaches that calcium acetate-calcium fatty acid soap grease compositions of high film strength are obtained by using large excesses of calcium acetate; that is, the calcium acetate/calcium fatty acid soap mol ratios must be at least 7 to 1, even as high as 40 to 1. Patentees point out that prior to their invention, greases having salt/soap mol ratios less than that noted had low film strength.

U.S. Patent No. 2,596,556 teaches that urea can be used as a complexing agent in the preparation of water resistant, high temperature grease compositions, emphasizing that such greases must be neutral.

In contrast to the compositions described hereinabove, applicant's greases have calcium acetate-calcium hydroxystearate mol ratios less than 5 to 1; and are basic. In the preparation of the grease compositions defined herein, it is necessary that the amount of basic compound is in excess of that sufficient to neutralize any saponifiable or salt-forming components.

Although, because of the uniqueness of the grease thickeners defined herein, smaller amounts of the conventional grease thickeners need be used to obtain greases having consistencies necessary for multi-purpose greases, the agents described hereinbelow improve considerably the yield of such thickeners.

Such grease compositions prepared according to the prior art, although they can be characterized as water resistant, high temperature greases, cannot be used wherein it is essential to have high film strength for proper lubrication of frictional surfaces.

It is a primary object of this invention to describe certain agents which will increase the yield of calcium base thickeners to form grease compositions having exceptionally high film strengths and using low acetate-hydroxystearate ratios.

In accordance with this invention, it has been discovered that alkyl methacrylate-vinyl pyrrolidone copolymers increase the yield of grease compositions containing a calcium soap of 12-hydroxy stearic acid (or its equivalent), calcium acetate in amount of from 2 mols to 5 mols for each mol of said calcium soap of 12-hydroxy stearic acid, excess base expressed as calcium hydroxide, and calcium carbonate in amounts sufficient to impart improved consistency to said grease composition, which calcium carbonate is obtained by reacting urea with calcium hydroxide.

Although the grease compositions have amounts of base (i.e., calcium hydroxide) in excess of that necessary for the neutralization of the acidic components used in the preparation of the grease, such base need not be present in the finished grease as calcium hydroxide. Although this excess base is expressed herein as free calcium hydroxide, such base may form basic salts, for example, basic calcium carbonate, basic calcium acetate, and basic calcium 12-hydroxy stearate. However, no theory is postulated herein to explain the possibility of basic salt formation.

The grease compositions described in this invention are water resistant, have high film strength, have improved work stability, and have excellent high temperature characteristics. The grease compositions formed according to this invention have ASTM dropping points as high as 700° F. and higher. Such greases can be used in steel mills, automobile and truck chassis, rock crushers, electric powered excavation equipment, shaking screens, cement plants, railroad service (particularly journal bearings), in aviation equipment, etc.

As used therein, the term "calcium soap of 12-hydroxy stearic acid" also includes the calcium soap of hydrogenated ricinoleic acid.

The calcium 12-hydroxy stearate is used in amounts sufficient to thicken oils of lubricating viscosity to the consistency of a grease; that is, in amounts ranging from 5% to 25%, by weight, preferably 7% to 12%, by weight The calcium acetate is used in amounts of 4% to 25%, by weight, 6% to 12% by weight being preferred.

For the desired characteristics of the final grease composition, it is essential that the above-named components be present in the grease composition in certain proportions with respect to each other. For example, it is essential that the mol ratio of the calcium acetate to the calcium 12-hydroxy stearate have values less than 5; ranging preferably from 2 to 5; that is, that the calcium acetate/calcium 12-hydroxy stearate mol ratio be from 2:1 to 5:1.

The calcium carbonate present as a component in the final grease composition (which component increases the consistency of the grease) is obtained by the reaction of urea with calcium hydroxide during the preparation of the grease. Based on the finished grease, urea is used in amounts of about 1.0% to about 6.0% by weight. Since 1 mol of urea is believed to react with 1 mol of calcium hydroxide to form the calcium carbonate, the finished grease composition thus prepared has from about 1.7% to about 10.0%, by weight, of calcium carbonate; preferably about 2.0% to about 6.0%, by weight.

It is essential that the calcium hydroxide be used in an amount in excess of that necessary to form calcium 12-hydroxy stearate from the 12-hydroxy stearic acid, calcium acetate from the acetic acid, and calcium carbonate from reaction with urea. The excess calcium hyroxide is such that the finished grease has from 1% to 8%, by weight, of excess base expressed as calcium hydroxide.

The alkyl methacrylate-vinyl pyrrolidone copolymers effective herein to harden the calcium base grease, that is, to increase the yield of the calcium grease thickeners, are exemplified by the copolymer which is sold by the trade names, "Acryloid 917," and "Acryloid 966," which are further identified as an alkyl methacrylate-vinyl pyrrolidone copolymer having a molecular weight of approximately 300,000 and 475,000, respectively, and a nitrogen content of about 1%, and wherein the alkyl radicals are mixed $C_{12}$ and $C_{18}$ alkyl radicals. For the purpose of this invention, such copolymers may have molecular weights from 100,000 to 500,000; and the nitrogen content may vary from 0.5% to about 1.5%. These copolymers are used in amounts of 0.1% to 10% by weight, preferably 0.3% to 5.0% by weight. For the purpose of brevity, whenever the term "copolymer" is used herein, such term means the above-described alkyl methacrylate-vinyl pyrrolidone copolymer.

In the preparation of the grease described in U.S. Patent No. 2,596,556 noted hereinabove, wherein urea is a complexing agent, there can be an excess of 0.1 to 3 equivalents of calcium hydroxide per equivalent of calcium 12-hydroxy stearate. However, in the preparation of the grease composition described herein, it is essential to use from 6 to 18 equivalents of calcium hydroxide per equivalent of calcium 12-hydroxy stearate.

Lubricating oils which are suitable as base oils for the grease compositions of this invention include a wide variety of oils, such as mineral oils, as exemplified by the naphthenic base, paraffin base, and mixed base oils derived from petroleum, including lubricating oils derived from coal products, etc.

The grease compositions of the invention can be prepared by blending the 12-hydroxy stearic acid (or the alkyl ester thereof) with an oil, and heating the blend sufficiently to disperse the acid in the oil. A large excess of calcium hydroxide (i.e., from 6 to 18 equivalents per equivalent of 12-hydroxy stearic acid) is then added and the whole mixture stirred to obtain a uniform dispersion of the resulting soap in the oil. The mixture is then heated to a temperature of about 180° F., after which the acetic acid is added slowly. The whole mixture is stirred for a period of time sufficient to obtain a smooth dispersion, after which the urea is added, and the mixture is heated to a temperature of about 320° F. under a pressure of polymer may be added. The copolymer may be added cal, is maintained by bleeding into the atmosphere the ammonia formed during the conversion of the urea. The mixture is then heated to a temperature ranging from about 320° F. to about 450° F. at atmospheric pressure for the purpose of completing the reaction, at which time the alkyl methacrylate-vinyl pyrrolidone copolymer may be added. The copolymer may be added after the grease has cooled to ambient temperatures.

The examples hereinbelow illustrate the preparation of grease compositions of this invention.

EXAMPLE I

A mixture of 7.9%, by weight, of 12-hydroxy stearic acid and about 45%, by weight, of a California solvent refined paraffinic base oil having a viscosity of 480 SSU at 100° F. was heated to a temperature of 130° F. 15% of hydrated lime was then added and the mixture was agitated at 130° F. for a period of time sufficient to form a uniform blend. The whole mixture was heated to 180° F. and maintained at that temperature for a period of 30 minutes, after which 8%, by weight, of acetic acid was added slowly during a period of 30 to 45 minutes. 10% of the same oil described hereinabove was then added, after which there was added 2.2%, by weight, of urea, and the mixture was heated to 320° F. at a pressure of 70-90 p.s.i. for a period of one hour. The whole mixture was then heated at 330° F. at atmospheric pressure, followed by the addition of 1.5% of oxidation and rust inhibitors, 3% of the copolymer A described hereinbelow having an average molecular weight of 475,000, and the remainder of the oil to make 100%.

As exemplified hereinbelow in Example II, the grease may also be prepared by the use of an ester of 12-hydroxy stearic acid.

EXAMPLE II

A mixture of 7.9% of methyl 12-hydroxy stearate and 45% of a California solvent refined paraffinic base oil having a viscosity of 480 SSU at 100° F. was blended at room temperature, then heated to a temperature of 120° F. Calcium hydroxide was added in an amount of 15% by weight, after which the mixture was agitated to obtain a uniform dispersion in the oil. There was then added 0.1% sodium hydroxide in 1% water (used herein as a catalyst), and the whole mixture was heated to 180°–200° F. for a period of 30 minutes, after which 8.0% of glacial acetic acid was added over a period of time of about 30–45 minutes. At this point there may be added 10%, by weight, of the lubricating oil described hereinabove. 2.2% by weight, of urea was then added at 180° F., followed by sealing the mixture from the atmosphere and heating to 320° F. at 70–90 p.s.i. for a period of about one hour. The mixture was then vented to the atmosphere and heated at 330° F. for a period of one hour at atmospheric pressure, followed by the addition of 1.5% of oxidation and rust inhibitors, 3% of the copolymer A described hereinbelow having an average molecular weight of 475,000, and the balance of the oil to make a total of 100%.

EXAMPLE III

A mixture of 6.3% by weight of final composition of methyl 12-hydroxy stearate and 45% by weight of a California solvent refined paraffinic base oil having a viscosity of 480 SSU at 100° F. was blended at room temperature, then heated to a temperature of 130° F., followed by the addition of 13% by weight of hydrated lime. The mixture was stirred sufficiently to make a uniform dispersion in the oil. There was then added 0.1% sodium hydroxide in 1% water, followed by the addition, with agitation, of 3.7% by weight of acetic acid at a temperature below 150° F. 4.9% by weight of urea was added and the mixture was heated to 300–340° F. under pressure of 70–100 p.s.i. for one hour. The pressure was vented and temperature was then increased to 430° F. After cooling to 160° F., there was added 1.8% of rust inhibitor, and 0.6% by weight of the copolymer A described hereinbelow having an average molecular weight of 475,000, and the balance of the base oil to make a total of 100% by weight.

Table I hereinbelow sets forth the components used in the preparation of greases to which were added the copolymers.

*Table 1*

| Components Used in Preparation of Grease Base | Grease No. | | |
|---|---|---|---|
| | 1 (Wt. percent) | 2 (Wt. percent) | 3 (Wt. percent) |
| 1. Methyl 12-Hydroxy Stearate | 6.1 | 6.7 | 7.9 |
| 2. Glacial Acetic Acid | 3.7 | 4.1 | 8.0 |
| 3. Urea | 6.7 | 5.4 | 2.2 |
| 4. Hydrated Lime | 15.0 | 13.8 | 15.0 |
| 5. Sodium Hydroxide | a 0.1 | a 0.1 | a 0.1 |
| 6. Base Oil | 66.9 | 68.45 | 66.5 |
| 7. Oxidation and Rust Inhibitors | 1.5 | 1.45 | 0.3 | a Catalyst.

The base oils for Greases 1, 2, 3 were blends consisting of, on a weight basis, 50% of a California paraffin base oil having a viscosity of 145 SSU at 100° F., 36% of a California naphthenic base oil having a viscosity of 2100 SSU at 100° F., and 14% of a California paraffinic base oil having a viscosity of 2400 SSU at 100° F.

Table II hereinbelow illustrates the effectiveness of the copolymers in increasing the yield of the calcium greases described herein. The grease numbers refer to the base greases of Table I hereinabove.

Copolymer "A" was a mixed $C_{12}$–$C_{18}$ alkyl methacrylate-vinyl pyrrolidone copolymer having a molecular weight of approximately 475,000.

Copolymer "B" was a mixed $C_{12}$–$C_{18}$ alkyl methacrylate-vinyl pyrrolidone copolymer having a molecular weight of approximately 300,000.

*Table II*

| Composition | ASTM Penetrations | |
| --- | --- | --- |
| | Worked (60) | Unworked |
| Grease No. 1: | | |
| Base Oil | >600 | >600 |
| Base Oil+3% Copolymer B | >600 | >600 |
| Grease Base | 317 | 284 |
| Grease Base+Copolymer B— | | |
| 0.8 wt. percent | 284 | 240 |
| 1.8 wt. percent | 260 | 220 |
| 3.0 wt. percent | 252 | 214 |
| Grease No. 2: | | |
| Base Oil | >600 | >600 |
| Base Oil+3% Copolymer B | >600 | >600 |
| Grease Base | 325 | 276 |
| Grease Base+Copolymer B— | | |
| 1.0 wt. percent | 287 | 232 |
| 1.8 wt. percent | 284 | 220 |
| 3.0 wt. percent | 280 | 216 |
| Grease No. 3: | | |
| Base Oil | >600 | >600 |
| Base Oil+2% Copolymer A | >600 | >600 |
| Grease Base | 343 | 324 |
| Grease Base+2% Copolymer A | 323 | 279 |
| Base Oil+2% Copolymer B | >600 | >600 |
| Grease Base+2% Copolymer B | 310 | 278 |

The data of the tables hereinabove clearly show that the copolymers defined herein effectively harden the highly basic calcium 12-hydroxystearate-calcium acetate greases herein, that is, increase their yield.

The copolymers described herein have no effect on the yield of normal calcium base greases. For example, the addition of 2% of Copolymer B described hereinabove to a normal calcium base grease thickened with 10.5% by weight of a calcium soap of tallow fatty acids had no effect whatsoever on the yield of the grease.

I claim:

1. A grease composition having extreme pressure characteristics consisting essentially of a mineral oil of lubricating viscosity, from about 7.0% to about 12.0% by weight of calcium 12-hydroxy stearate, from 6.0% to about 12.0% by weight of calcium acetate, from 2.0% to about 6.0% by weight of calcium carbonate, from 1.0% to 8.0% by weight of calcium hydroxide, wherein the mole ratio of said calcium acetate to said calcium 12-hydroxy stearate has a value from 2 to 5, and said calcium carbonate is derived from the reaction of urea with calcium hydroxide, and from 0.1% to 10% by weight of an alkyl methacrylate-vinyl pyrrolidone copolymer having a molecular weight in the range of 100,000 to 500,000.

2. A grease composition having extreme pressure characteristics consisting essentially of a mineral oil of lubricating viscosity, from about 7.0% to about 12.0% by weight of calcium 12-hydroxy stearate, from 6.0% to about 12.0% by weight of calcium acetate, from 2.0% to about 6.0% by weight of calcium carbonate, from 1.0% to 8.0% by weight of calcium hydroxide, wherein the mole ratio of said calcium acetate to said calcium 12-hydroxy stearate has a value from 2 to 5, and said calcium carbonate is derived from the reaction of urea with calcium hydroxide, and from 0.3% to 5% by weight of an alkyl methacrylate-vinyl pyrrolidone copolymer having a molecular weight in the range of 100,000 to 500,000.

References Cited in the file of this patent

UNITED STATES PATENTS

| | | |
| --- | --- | --- |
| 2,417,428 | McLennan | Mar. 18, 1947 |
| 2,595,556 | Worth et al. | May 6, 1952 |
| 3,007,866 | Chamberlin | Nov. 7, 1961 |

FOREIGN PATENTS

| | | |
| --- | --- | --- |
| 808,665 | Great Britain | Feb. 11, 1959 |

UNITED STATES PATENT OFFICE
CERTIFICATE OF CORRECTION

Patent No. 3,159,575                 December 1, 1964

Dean W. Criddle

It is hereby certified that error appears in the above numbered patent requiring correction and that the said Letters Patent should read as corrected below.

Column 3, lines 46 and 47, strike out "polymer may be added. The copolymer may be added cal" and insert instead -- 70 to 95 psi. This pressure range, which is not critical --.

Signed and sealed this 6th day of April 1965.

(SEAL)
Attest:

ERNEST W. SWIDER
Attesting Officer

EDWARD J. BRENNER
Commissioner of Patents